United States Patent
Becker

(10) Patent No.: US 8,416,929 B2
(45) Date of Patent: Apr. 9, 2013

(54) SHARING SOLUTIONS FOR A UNIVERSAL LINKING GATEWAY BETWEEN TELEPHONIC DEVICES

(76) Inventor: Christopher Henry Becker, Calgary (CA)

( * ) Notice: Subject to any disclaimer, the term of this patent is extended or adjusted under 35 U.S.C. 154(b) by 790 days.

(21) Appl. No.: 12/487,419

(22) Filed: Jun. 18, 2009

(65) Prior Publication Data

US 2009/0296918 A1 Dec. 3, 2009

Related U.S. Application Data

(63) Continuation-in-part of application No. 11/971,342, filed on Jan. 9, 2008.

(60) Provisional application No. 61/073,736, filed on Jun. 18, 2008.

(51) Int. Cl.
*H04M 11/00* (2006.01)

(52) U.S. Cl.
USPC .................................. 379/93.09; 455/554.2

(58) Field of Classification Search .... 379/93.09–93.11; 455/554.2
See application file for complete search history.

(56) References Cited

U.S. PATENT DOCUMENTS

| | | | |
|---|---|---|---|
| 4,658,096 A | 4/1987 | West, Jr. et al. | |
| 4,737,975 A | 4/1988 | Shafer | |
| 4,775,997 A | 10/1988 | West, Jr. et al. | |
| 4,922,517 A | 5/1990 | West, Jr. et al. | |
| 6,704,580 B1 * | 3/2004 | Fintel | 455/550.1 |
| 6,876,648 B1 * | 4/2005 | Lee | 370/353 |
| 6,959,172 B2 | 10/2005 | Becker et al. | |
| 6,978,154 B1 | 12/2005 | Ospalak et al. | |
| 6,987,988 B2 * | 1/2006 | Uchiyama | 455/557 |
| 7,020,488 B1 | 3/2006 | Bleile et al. | |
| 7,035,633 B2 * | 4/2006 | Kirkpatrick | 455/426.1 |
| 7,099,301 B1 * | 8/2006 | Sheu | 370/352 |
| 7,142,560 B2 * | 11/2006 | Mansfield | 370/466 |
| 7,162,228 B2 | 1/2007 | Bleile et al. | |
| 7,190,954 B2 | 3/2007 | Wonak et al. | |
| 7,822,188 B1 * | 10/2010 | Kirchhoff et al. | 379/211.02 |
| 7,907,550 B1 | 3/2011 | Chu et al. | |
| 2003/0137973 A1 * | 7/2003 | Kim et al. | 370/352 |
| 2004/0176077 A1 * | 9/2004 | Loveland | 455/414.1 |
| 2005/0249146 A1 * | 11/2005 | Pinault et al. | 370/328 |
| 2006/0187898 A1 | 8/2006 | Chou et al. | |
| 2006/0187900 A1 | 8/2006 | Akbar | |
| 2008/0247401 A1 * | 10/2008 | Bhal et al. | 370/401 |

OTHER PUBLICATIONS web.archive.org/web/20061127070221/http://www.utstar.com/Solutions/CPE/VoIP_ . . . dated Nov. 27, 2006.

* cited by examiner

*Primary Examiner* — Simon Sing
(74) *Attorney, Agent, or Firm* — Sean W Goodwin

(57) ABSTRACT

A universal linking gateway interfaces between a local network of one or more local phones, such as analog phones or PBX phones, a plurality of cell phones and multiple service lines, including a public switched telephone network. Implementation of industry standard protocols such as hook flash signals enable a simplistic local phone to access enhanced calling features including answering calls on multiple service lines, to select and make calls on any desired service line as well as handle simultaneous calls on either an active service line or multiple service lines. Further, the gateway manages security and data transfer features between the gateway and the telephonic devices connected thereto. The gateway interfaces between a variety of other telephonic devices including PSTN, VoIP, and telephonic intercoms. Wireless communications are controlled by the gateway for proper pairing management.

32 Claims, 9 Drawing Sheets

SHARING SOLUTIONS FOR A UNIVERSAL LINKING GATEWAY BETWEEN TELEPHONIC DEVICES

CROSS-REFERENCE TO RELATED APPLICATION

This application related to co-pending U.S. regular patent application Ser. No. 11/971,342, filed Jan. 9, 2008 and U.S. provisional patent application 61/073,736 filed June 18 the entirety of all of which are incorporated herein by reference for all purposes.

FIELD OF THE INVENTION

The present invention relates to a gateway for linking between various telephonic devices. More particularly, the invention relates to security and data transfer features between the gateway and the telephonic devices connected thereto.

BACKGROUND OF THE INVENTION

Docking stations are known for connecting a mobile phone or cell phone to one or more landline phone sets. An example of such a docking station is set forth in U.S. Pat. No. 4,775, 997 to West, Jr. et al. (West '997). Simply, one or more analog telephones or landline phone sets are connected through a port to the docking station. The docking station powers the landline phone sets. Further, the cell phone is recognized by the docking station and enables calls made to the cell phone to be answered on the landline phones sets and calls originating from the analog phone sets can be made through the cell phone. Basic hardware for a docking station is described therein and is known to those of skill in the art. The entirety of U.S. Pat. No. 4,775,997 is incorporated herein by reference.

In U.S. Pat. No. 6,959,172 (Becker '172), a similar docking station, for connecting a cell phone to analog phone sets, is equipped to power the phone sets and thus cannot be connected a public switched telephone network (PSTN) which normally powers the analog phone sets. Becker '172, specifically tests for powered lines and must only be connected to unpowered lines for enabling its gateway to the analog phones sets. Becker's docking station requires isolation of any PSTN from the landline phone sets for alternatively connecting the landline phone sets to the cell phone. Becker '172 uses the concept of a 'check line cord' indicator, such as seen on many landline telephones. It attempts to indicate to a user whether or not a device is plugged into a PSTN with battery voltage (powered line) however, there is no teaching on how to reliably accomplish this.

There continues to be a need for a device which enables use of landline phone sets with multiple cell phones, can manage multiple lines and which could also be connected to the PSTN. Further there is a need for a device which that enables multiple telephonic devices to be conveniently coupled and manage multiple and coincident phone calls.

SUMMARY OF THE INVENTION

The universal linking gateway enables a single telephonic device to be able handle incoming and outgoing calls from multiple sources. A phone connected to the linking gateway could answer an incoming call which is received at any one of a plurality of service lines. Implementation of industry standard Dual-Tone Multi-Frequency digits and hook flash signals enable a generic single line, ordinary telephone set, such as an analog phone or PBX set to answer calls on multiple service lines, to select and make calls on any desired service line as well as handle simultaneous calls on either an active service line or multiple service lines. Accordingly, conventional multiplexing devices are obviated, including line splitters, dual line telephones, or other devices placed ahead of each telephone set.

Further, the universal linking gateway can handle a variety of telephonic devices as readily as is embodiments implementing cell phones. Some of such other devices include PSTN, VoIP, and telephonic intercoms.

The universal linking gateway manages security features between the gateway and the telephonic devices prior to connecting the telephonic devices to the gateway and enables data transfer features between the gateway and the telephonic devices after the connection has been established.

In one embodiment of the invention, a phone system comprises a local network of analog telephones which includes a plurality of extension sets and a telephonic gateway which connects the local network of analog telephones to two or more telephonic devices associated with the gateway. The gateway comprises a first port for mimicking a powered FXS (foreign exchange station) interface and adapted for connecting to a network of one or more analog telephones; transceivers adapted for connection to two or more telephonic devices having at least two service lines associated therewith for carrying incoming and outgoing phone signals, the phone signals including phone calls; a controller for managing events between the one or more telephonic devices and the analog telephones comprising interpreting the phone signals between the transceivers and each of the telephonic devices connected therewith for establishing a service line identity for each of the at least two service lines and a signal format for each of the telephonic device, receiving a state signal from one of the one or more analog telephones for selecting the service line identity bearing a phone call of interest, connecting the phone call for the selected line identity in a form compatible with the selected service line identify and the analog telephones and prior to connecting the telephonic devices to the gateway managing security features associated with the gateway and the telephonic devices and enabling data transfer features between the gateway and the telephonic devices after the connection has been established.

As described in Applicant's co-pending U.S. regular patent application Ser. No. 11/971,342 and U.S. provisional patent application 61/073,736, some telephonic devices are equipped with Bluetooth® wireless communications using short-range radio frequency for digital information exchange. The linking gateway enables the intercommunication between multiple Bluetooth® audio devices. The gateway functionality can also extended to other devices such as WiFi enabled devices.

A method for managing at least two service lines between two or more telephonic devices is provided comprising: connecting two or more telephonic devices, including a network of one or more local telephones, through a gateway for communication of phone signals therebetween; interpreting phone signals between the telephonic devices for establishing a service line identity for each of the at least two service lines and a signal format for each of the telephonic devices, receiving a state signal from an active local telephone, of the network of one or more analog telephones, for selecting the service line identity bearing a phone call of interest, and connecting the phone call of interest the service line for the selected line identity in a form compatible with the active local telephone.

At least one of the telephonic devices is an enhanced telephonic device which has enhanced calling features and the gateway stores a table of one or more phone signals, which can be generated by the local telephones, which correspond with one or more of the enhanced features, and wherein upon receiving a phone signal corresponding with one of the enhanced features, the gateway forwards a command to the enhanced telephonic device to access that enhanced feature. One form of signally enables selection of service lines for enabling conferencing and another enables basic phones to access enhance features of an enhanced telephonic device.

In an analog phone environment, apparatus for enabling the methodology can comprise: a first port for mimicking a powered FXS interface and adapted for connecting to a network of one or more analog telephones; transceivers adapted for connection to two or more telephonic devices having at least two service lines associated therewith for carrying incoming and outgoing phone signals, the phone signals including phone calls; and a controller for managing events between the one or more telephonic devices and the analog telephones comprising interpreting the phone signals between the transceivers and each of the telephonic devices connected therewith for establishing a service line identity for each of the at least two service lines and a signal format for each of the telephonic device, receiving a state signal from one of the one or more analog telephones for selecting the service line identity bearing a phone call of interest, and connecting the phone call for the selected line identity in a form compatible with the selected service line identify and the analog telephones.

A method for managing at least two service lines between two or more telephonic devices comprises: connecting two or more telephonic devices, including a local network of one or more local telephones, through a gateway for communication of phone signals therebetween; interpreting phone signals between the telephonic devices for establishing a service line identity for each of the at least two service lines and a signal format for each of the telephonic devices, receiving a state signal from an active local telephone of the network of one or more local telephones, for selecting the service line identity bearing a phone call of interest, and connecting the phone call of interest to the service line for the selected line identity in a form compatible with the active local telephone. In one embodiment, the local network is a network of analog phones and in another embodiment, the local network is a private branch exchange or key system unit PBX/KSU network of local phones.

DETAILED DESCRIPTION OF THE PREFERRED EMBODIMENT

Figure 1:
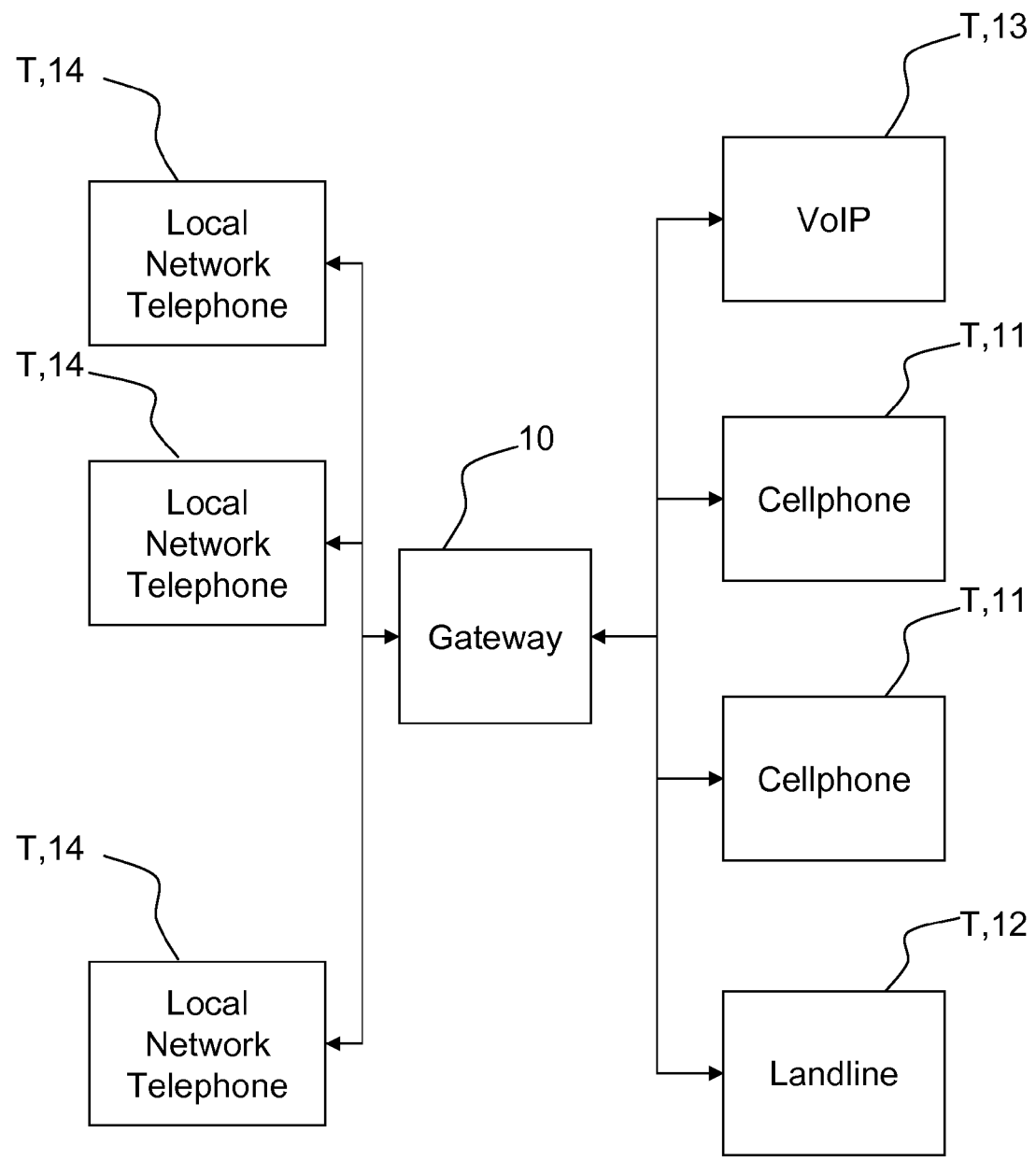
FIG. 1 is a flow chart of a gateway according to one embodiment of the invention, the gateway being connected to one or more cell phones and optional additional telephonic devices.

With reference to FIG. 1, a universal linking gateway is provided between telephonic devices including legacy single line analog telephones or telephones of a private branch exchange, and one or more other telephonic devices which can have same or different telephonic interfaces. The telephonic devices can comprise telephonic transceivers such as analog telephones, cell phones, internet protocol interfaces and can further comprise various service lines including networks of analog telephones, connections to public switched telephone networks (PSTN) and wireless services provided by cell phone service providers. The service lines themselves typically connect to one or more telephonic transceivers. The telephonic devices can be hardwired to the gateway through connection ports or connected through wireless interfaces. The gateway links phone signals between telephonic devices including phone calls and other data between telephonic devices and between a telephonic transceiver and one or more of the service lines.

FIG. 1 illustrates a general embodiment of the gateway 10 for interconnecting a plurality of telephonic devices T,T,T . . . . Telephonic devices T comprise devices which can transmit and receive telephone calls. Devices T can include multiple cell phones 11, land lines 12, Voice-over-Internet Protocol (VoIP) lines 13, and a local network 14n of single line telephones 14,14,14 . . . . There is no need for the local network 14n of analog phones 14 to be connected to the land line 12, such as a PSTN, or any other form of hardwired external telephone service. For example, a cell phone 11 may provided the only service line capable of external telephone service.

Communication can be managed between telephonic devices T,T,T without access at all to a service line, such as for data transfer or intercom service. Connections between the telephonic devices T,T,T and gateway 10 can be physical or wireless.

Beyond interconnectivity, the gateway 10 can provide added functionality to simplistic telephonic devices through enhanced signalling. Generally, there is limited signalling available on devices T such as generic analog telephones 14 or desktop phones of a private branch exchange. The gateway can enable a telephone 14, having limited pre-existing functionality, to handle multiple calls and enhanced call feature handling through enhanced signalling. Almost all generic analog telephones 14 are equipped with DTMF transmitters and a method of temporarily going on-hook. This is typically done with a 'hook flash' button on a telephone or manually manipulating the hookswitch.

The gateway stores a table of one or more phone signals, such as analog phone signals, which can be generated by the analog telephones, which correspond with to one or more of the enhanced features, and wherein upon receiving an analog phone signal corresponding with one of the enhanced features, the gateway forwards a command in a form compatible with the enhanced telephonic device to access that enhanced feature.

Using these signalling methods, it is possible to select and control calls through one or more service lines, such as those available through a provider of a cell phone 11, a PSTN, or other connection including VoIP 13.

Due to varying signal formats between telephonic devices T, the gateway interprets the phone signals between the transceivers and each of the telephonic devices connected therewith for establishing a service line identity and a signal format for each of the telephonic device.

Figure 2:
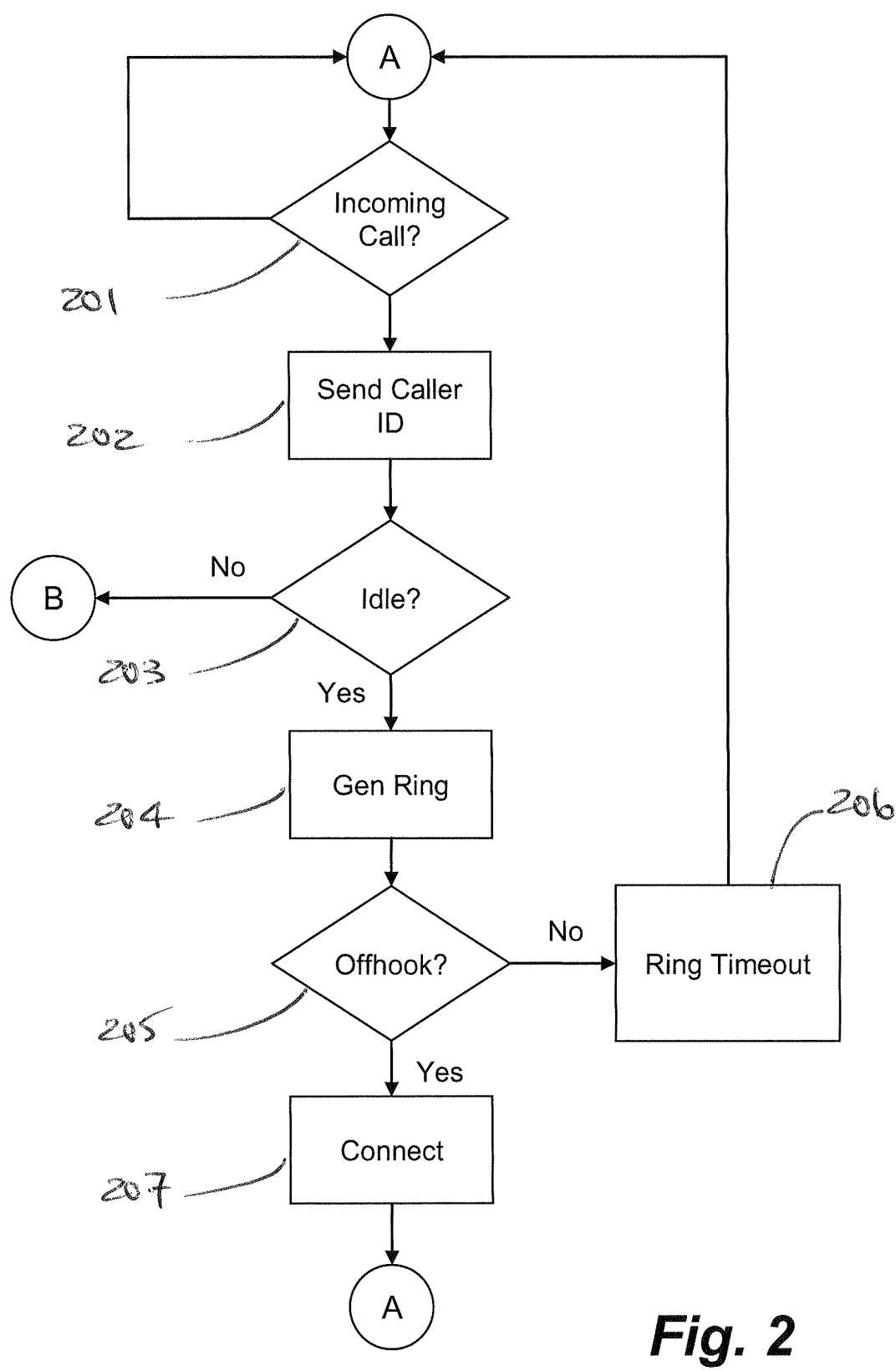
FIG. 2 is flow chart representing operation of a gateway receiving an incoming call having an idle network of analog phones.

With reference to FIG. 2, in one embodiment, starting at A, the gateway 10 detects an incoming call at 201 to any of the connected telephonic devices T. The gateway monitors all telephonic devices for state or conditions such as call activity, phone signals, hook flash and off-hook. If the user subscribes to caller ID features, the gateway sends a compatible signal, such as an FSK, for the caller ID at 202 as appropriate, either by an on-hook or off-hook format/protocol. If the gateway 10 is idle at 203, having no active calls, the gateway generates a ring signal at 204 to the network 14*n* of telephones 14. If the gateway detects an off-hook condition at 205 on the analog telephone network 14*n* before a ring timeout at 206, then the gateway connects at 207 the audio path from the source service line to the local telephone network 14*n*, now handing the active call.

Figure 3A:
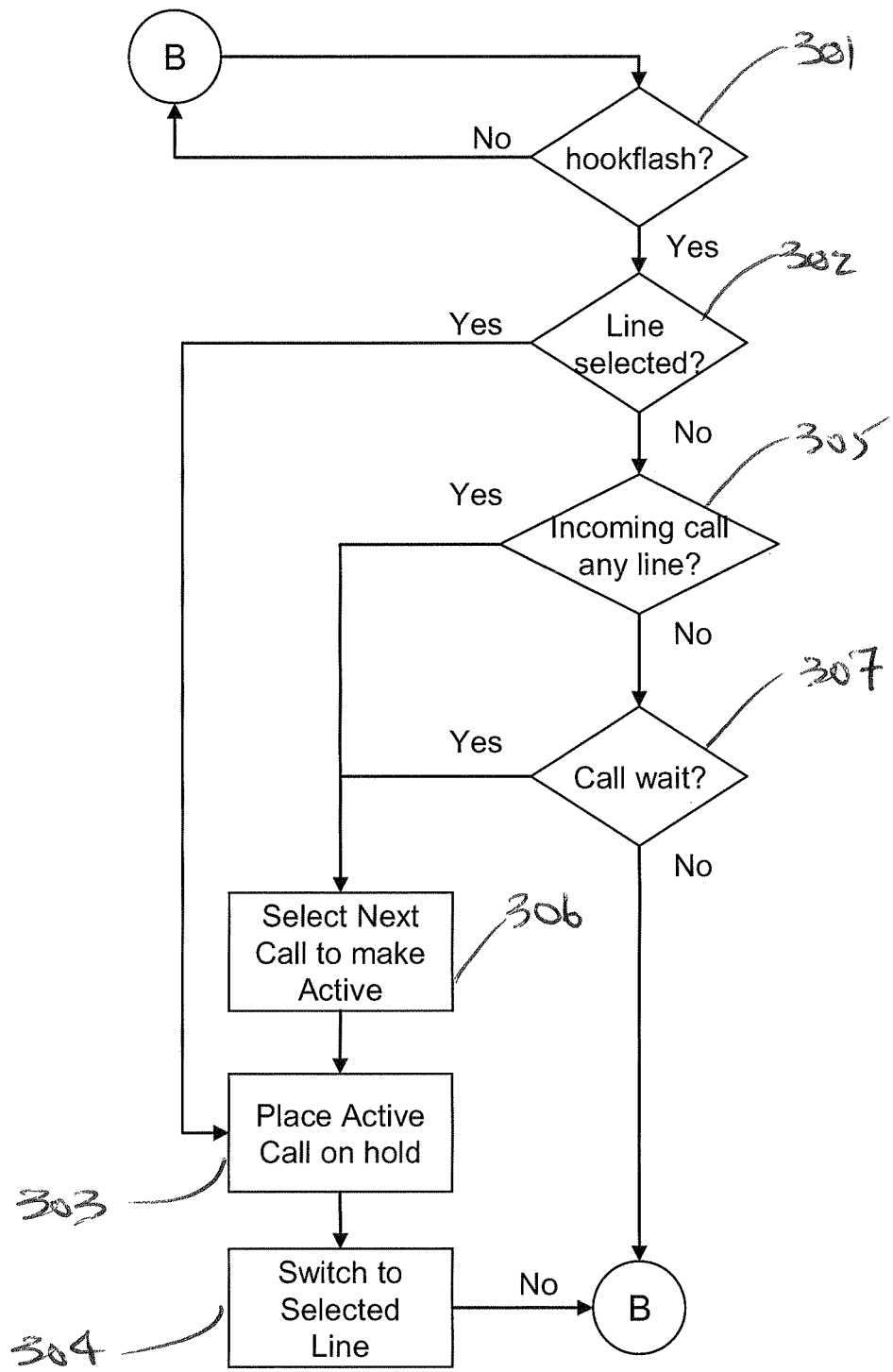
FIG. 3A is flow chart representing response of the gateway operation according to FIG. 2, wherein the network of analog phones is in use.

Returning to 203, if the gateway is not idle, as there is an active call in progress, then the flow is directed to B, as detailed in FIG. 3A.

Figure 3B:
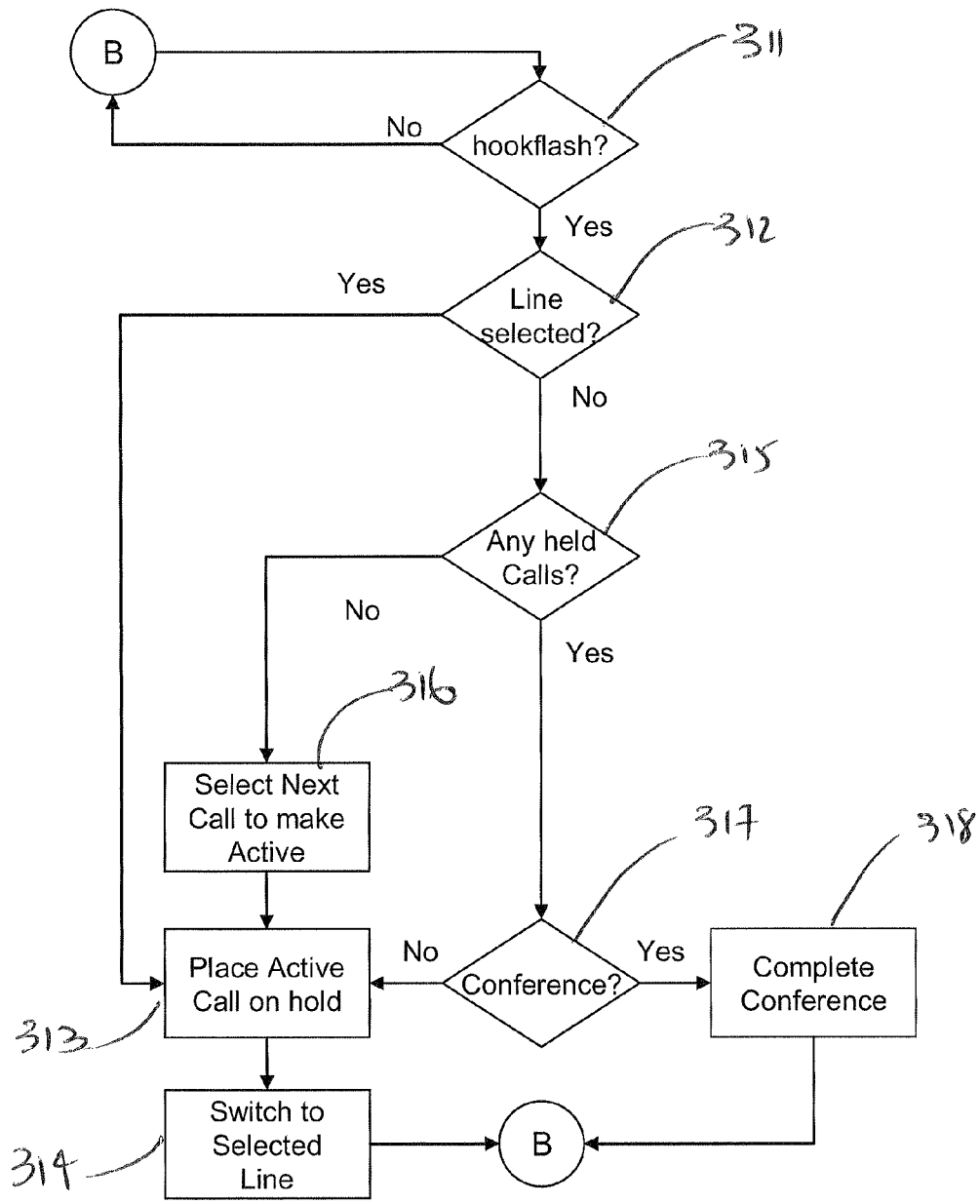
FIG. 3B is flow chart representing and optional response of the gateway operation according to FIG. 2 for enabling a conference call between two or more service lines.

With reference to FIGS. 3A and 3B, where an active call is already in progress, the gateway 10 is not idle, and an incoming additional call will be handled by the gateway to enable the active user to manage both the active and incoming calls.

One scenario is for the user to place the active call on hold and selecting another service line, such as the incoming additional call. Other scenarios selecting some other call previously placed on hold, or conferencing several calls together. Alternatively, in a less interesting situation, the incoming additional call is ignored by the user and eventually times out to be directed to voice mail or merely continues to ring unanswered.

In FIG. 3A, in the more relevant scenario, that an incoming line is of interest to the user already on an active line. Starting at B, the gateway 10 monitors for user interaction that the incoming additional call should be answered. The gateway provides a new call indicator such as a call tone, beep or announced connected device name. The gateway monitors for a hook flash at 301 on the network 14*n*. If there is no hook flash at 301 the logic loops to B, typically until a timeout (not detailed), such defaulting to voice mail.

If there is a hook flash detected on the network 14*n* before timeout, then a user has indicated they will take that incoming call. Specialized hook flash information can select a particular line; hook flash #1 selecting line #1, hook flash #2 selecting line #2 and so on. Enhanced hook flash information can be implemented on simple analog phones by coordinating analog phone signals and gateway interpretation. The gateway receives a state signal from one of the one or more telephonic devices for selecting the service line identity bearing this phone call of interest. The gateway uses the hook flash information to select a new line at 302, put any current active calls on hold at 303 and switch the new additional call at 304 to the local network 14*n* and phone 14 for the user.

In many instances, the user merely provides a hook flash without a service line indication, the gateway defaults to selects the incoming additional call. The gateway 10 ascertains the source or line of the incoming call at 305. Say the active call is on line 1. The incoming call could be a call on a previously idle line, say a second cell phone on line 2, or it may be an additional new call on a line at 307, such as line 1, already in use. The gateway selects the indicated line at 306, puts any current calls on hold at 303 and switches the new call at 304 to the local network.

The gateway can check for a call waiting event on any of the service lines. The gateway can further check for any previous calls on hold and permit selection of any one of the calls, or joining one or more of the calls in conference.

As shown in any alternate gateway operation of FIG. 3B, conferencing can now be achieved using telephone devices not otherwise so equipped. In one embodiment, with the gateway already handling an active call, the gateway loops at 311 seeking a hook flash. If a specific line-selecting hook flash is detected at 312, the gateway uses the hook flash information to select a new line, putting any current active calls on hold at 313 and switching for receiving or making a new additional call at 314 to or from the local network 14*n*.

In the case of another incoming call or an outgoing call, the gateway looks for a second hook flash sequence for conferencing with the first call. Where a non-line specific hook flash is detected at 312, the gateway looks for any held calls at 315, for example the first call. If there are not held calls, the gateway can select a line to make an outgoing call at 316. If there is one or more held calls, being the call on the first line, the user can select conference at 317 for completing the conference at 318 for connecting the first and second lines together at with the user at the analog phone.

This second selected line can enable a traditional '3-way call', such that it uses the same physical line, or it can be a completely different physical line. For example, one could place a first call on a cell phone through the cell network line, being the active call, place the cell phone active call on hold, select a second line being a land line, place a second call, and switch between the first cell phone service line, the second land line or conference them together. Selecting additional and successive lines, the gateway can allow conferencing of more than three parties on more than three lines.

As a further example, Table 1 demonstrates conferencing of an existing answered call on a first line L1 with a second placed call on a second line L2.

TABLE 1

| User - Analog Phone | Gateway | Service line 1 | Service Line 2 |
|---|---|---|---|
| Ringing |  | A - Incoming Call FIG. 2 - 201 |  |
| Pickup | Off hook?, 205 |  |  |
| Answered | Connect, 207 | Connected |  |
| Want to place second call |  |  |  |
| Flash | B - Hook flash FIG. 3B, 311 |  |  |
| Flash not-specific | Non-specific, 312 None on hold, 315 Select default line, 316 L1 on hold, 313 L2 selected, 314 | On hold | Selected Active |
| Makes second call | Loop B, Hook flash, 311 |  |  |
| Flash not-specific | Non-specific, 312 L1 is on hold, 315 |  |  |
| 3-way conversation | Conference L1 and L2 | Active | Active |

Figure 4:
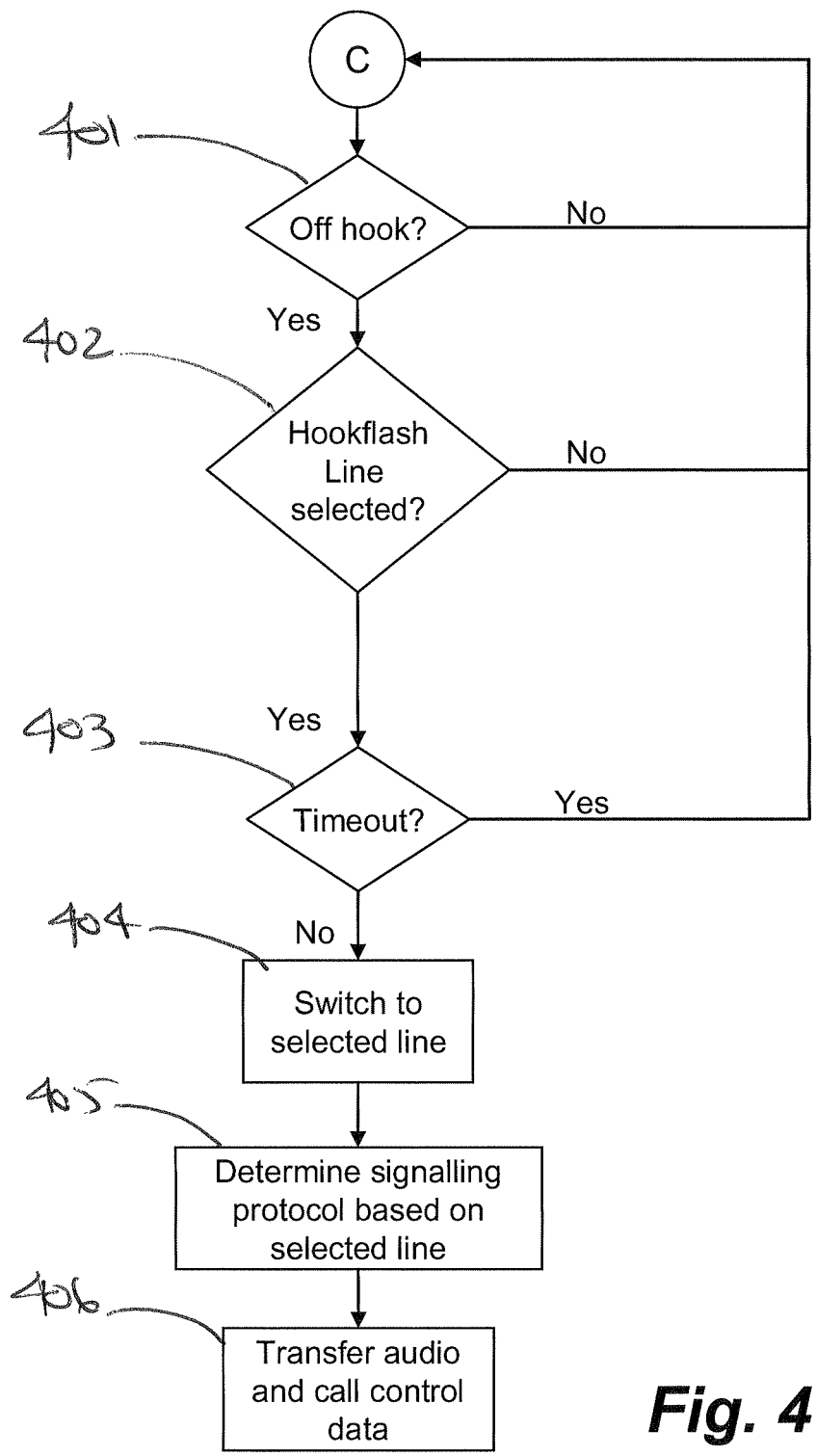
FIG. 4 is a flow chart representing the gateway operation for handling outbound calling from a connected telephonic device.

With reference to FIG. 4, the gateway can handle outbound calls at C. The gateway manages signal compatibility between analog and digital and between variable digital protocols. The gateway monitors for an off-hook at 401. The gateway allows the user to select which service line to use at 402, monitoring for a DTMF/hook flash sequence for signalling which line to select. The line select hook flash at 402 must occur within a pre-determined time period 403 else the gateway returns monitoring for an off-hook at 401. If a hook flash occurs within the time period, the call has not timed out, and a service line is being selected at 404. In one embodiment, a '1', FLASH, indicates that the gateway should use Line 1 for the next operation, a '3' FLASH indicates that the gateway should use Line 3 for the next operation. The DTMF codes, hook flash duration, DTMF-FLASH timeout, and prime line can be pre-defined in this case or configurable by the user.

Upon receiving the correct sequence at 403, the gateway connects the audio path to the off-hook telephonic device such as the local telephone network 14n, and awaits further call control instructions. The next call control instructions vary depending on which service line was selected. While the user will only have to press DTMF digits, the gateway 10 interprets and converts at 405 the signalling to match the associated line. For example, dialing an outbound call through a cell phone service line uses different gateway signalling than dialing an outbound landline or VoIP call. The gateway transfers the call at 406, including audio and call control data to the selected line.

The operations of the gateway can equally use cell phones and ordinary, non proprietary, single line telephones for access to multiple service lines.

In the particular instance of Bluetooth® enabled telephonic devices T, there are pairing protocols to resolve and certain other challenges. Applicant is not currently aware of existing methods for coordinating multiple Bluetooth® audio streams to a single control point such as is applicant's gateway 10. Existing Bluetooth® cell phone devices, like docking stations, car kits and headsets, can be paired to multiple devices yet do not allow multiple simultaneous voice paths. The gateway 10, according to embodiments of the invention, provides such an implementation.

Figure 5:
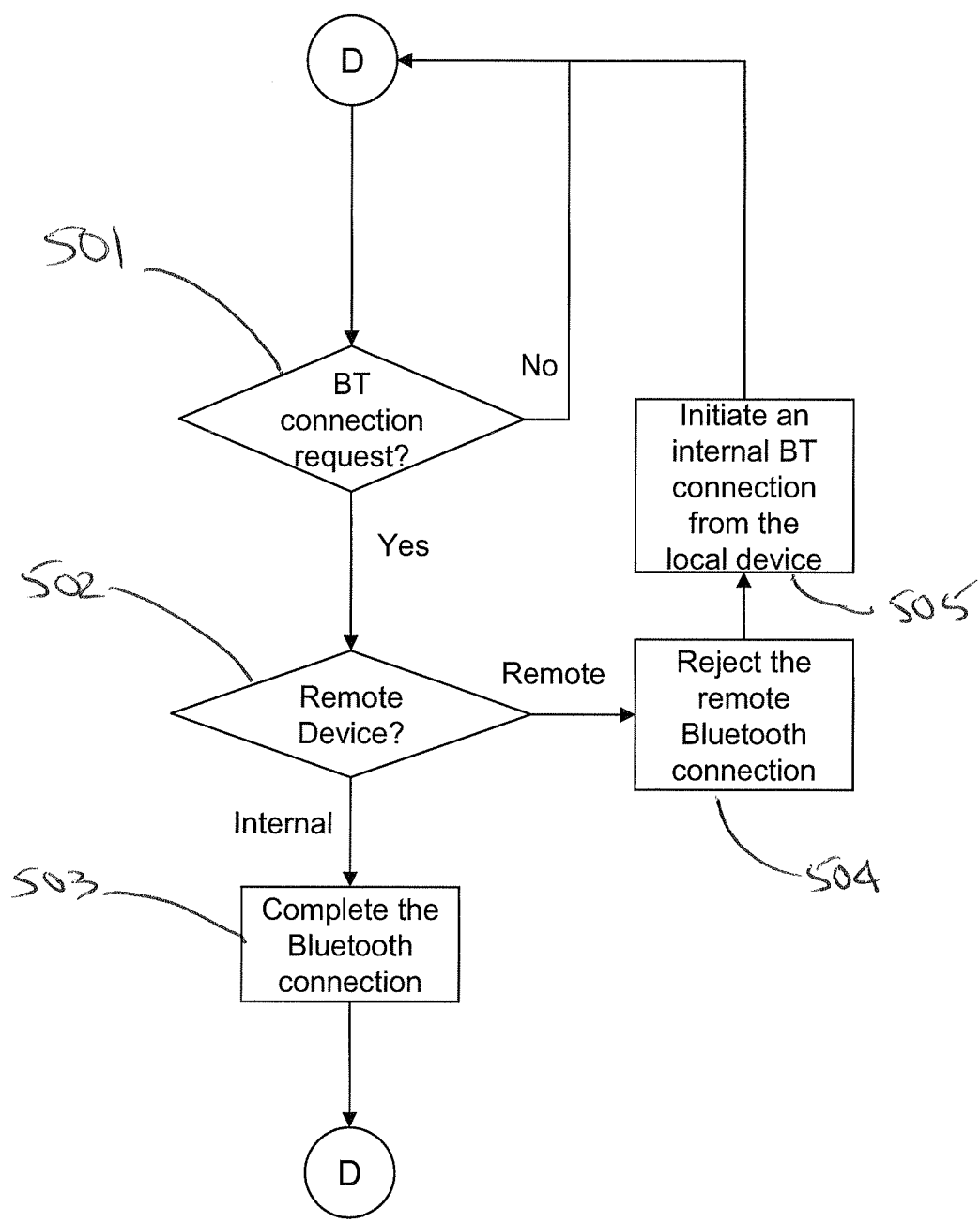
FIG. 5 is a flow chart representing the gateway management of Bluetooth® enabled cell phones.

With reference to FIG. 5, starting at D, when the gateway 10 receives a first request at 501 for a Bluetooth® audio connection, the gateway checks at 502 if the request is from remote device T, or is an internal request. If the first request is an internal request, the request is granted and the audio path is established at 503 between the internal device and a remote device T. In this case, as the gateway has requested the connection, it is the master of the session.

Instead, at 502, if the first request is from a remote device, then the first request is rejected at 504, however, a second internal request from the Bluetooth®-enabled gateway is immediately sent back at 505 to the remote device T which had made the initiating request. As the second request is now an internal request, this second request is allowed and the audio connection is made at 503.

This process allows the gateway 10 to always be the master of all Bluetooth® audio sessions that it is part of. Ensuring the gateway is always the master permits proper arbitration of the remote devices T so as to put them on hold, switch between various calls handled by the gateway and generally perform call control functions as requested by the user using the telephone sets on the local telephone network. There are additional, known methods for selecting the roles of master slave, but they are not universal, and not all Bluetooth® devices respond to the official Bluetooth® protocol. This embodiment ensures the same result with an assurance that the gateway will be able to handle the connection between multiple Bluetooth® devices, or between Bluetooth® devices, landlines or VoIP lines alike.

Figure 6:
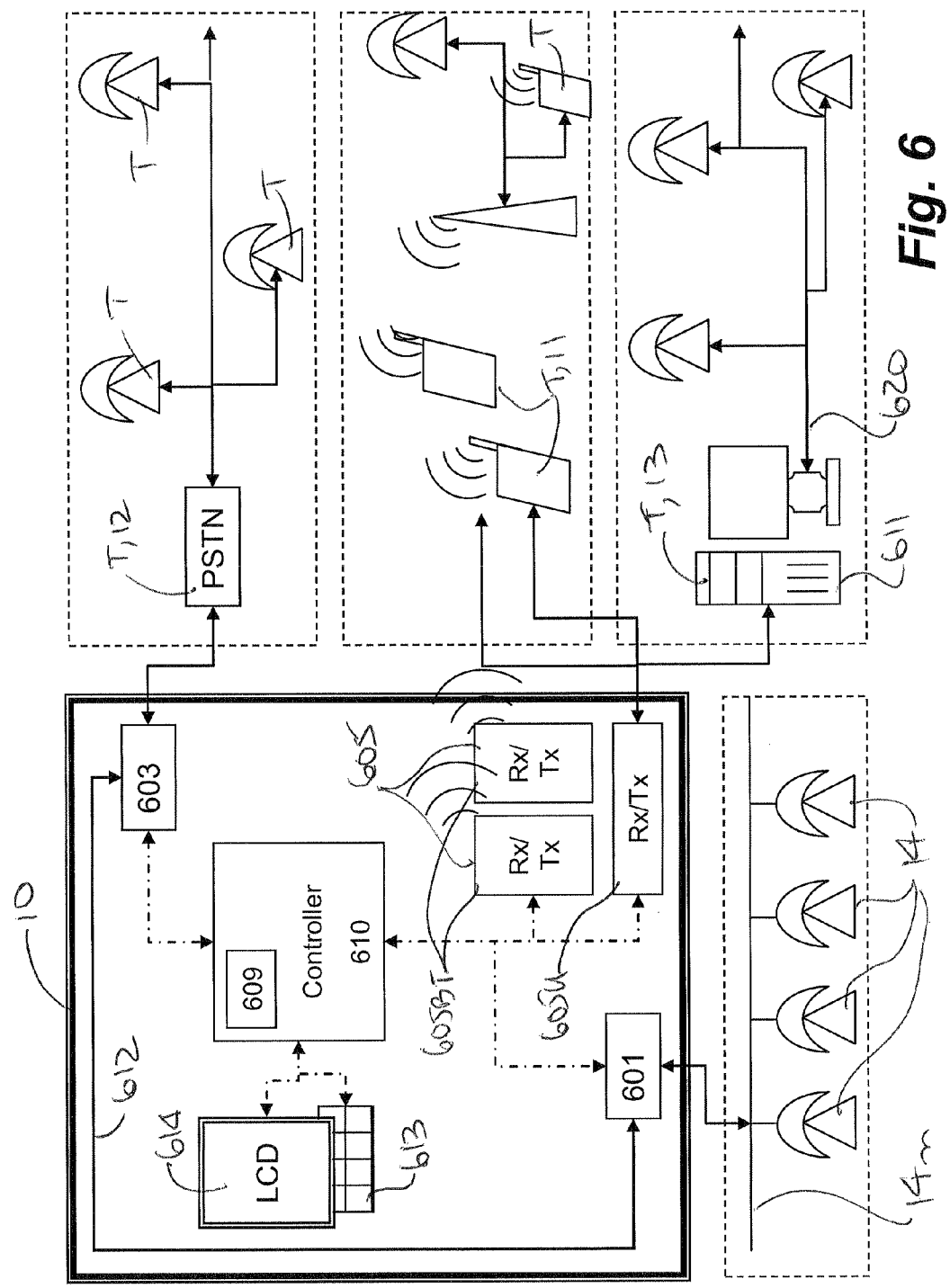
FIG. 6 is a schematic of a gateway according to an embodiment of the invention.

The various embodiments and methodology of the present invention can be implemented using apparatus, one form of which is set forth in FIG. 6. For reference, various of the hardware components implemented in this new gateway arrangement have been described in U.S. Pat. No. 6,959,172, the entirely of which is incorporated herein by reference.

As shown, the telephonic gateway 10 comprises at least a first link or FXS port 601 which mimics a powered FXS interface, the first FXS port 601 being adapted for connecting to an analog telephone 14 or a network 14n of one or more analog telephones 14,14,14 . . . . A second FXO port 603 mimics an FXO interface as an analog link to receive/transmit voice/data to/from a landline or PSTN 12 including FSK, DTMF, and DP signalling capability and a plurality of further connected telephonic devices T.

The gateway 10 further comprises one or more transceivers 605 which are adapted for managing signals from two or more wireless telephonic devices T and transmitting phone signals therebetween. Exemplary telephonic devices include one or more cell phones 11, 11 . . . .

A controller 610 manages events between the one or more telephonic devices T, including the network of analog telephones 14, interpreting phone signals between the FXS and FXO interface ports 601,603, transceivers 605 and each of the telephonic devices T connected therewith and establishing a line identity for each of the telephonic devices. The controller 610 includes program memory 609 for implementing specific instructions. The controller 610 receives a state signal from the analog telephones 14 for selecting the line identity of a single phone signal of interest and forwarding the phone signals for the selected line identity in a form compatible with the analog telephones 14.

In more detail, the FXS port 601, having a Subscriber Line Interface Circuit (SLIC) provides analog voice/signalling, including frequency shift keying (FSK), Dual tone multifrequency DTMF, PP, to the analog telephones 14. The transceivers 605 include one or more Bluetooth® transceivers 605B and Universal Serial Bus (USB) transceivers 605U. The Bluetooth® or BT transceiver or transceivers 605B are capable of pairing to and connecting to multiple devices Bluetooth® equipped telephonic devices T,11 simultaneously. The USB transceiver 605U connects to single or multiple USB devices, host or device side simultaneously or singularly. An example is a computing device, such as a personal computer (PC) 611.

The gateway is provided with failsafe power outage capabilities. Conventional FXS port hardware, unless equipped with battery backup, will not function during a power outage. Often PSTN service lines 12 remain operational during power outages. A failsafe circuit redirects control of the FXS and FXO interface ports 601,603 from the controller 610 for directly connecting therebetween. A hardwired path 612 between the FXS and FXO ports 601,603 bypasses the controller 610 in case of power outage for routing conventional PSTN 12 to any attached analog phone 14 enabling emergency "911" priority routing for any 911 from any analog phone to the PSTN 12.

The gateway 10 can include a keypad 613 for data input and display 614, such as LEDs' or LCD. A data/memory bus and control circuits 615 interconnect the controller 610 and various components.

The FXO interface port 603 enables calls between the gateway 10, a PSTN 12 and a remote telephonic device T. One or more mobile devices T, including cell phones 11, 11, 11 . . .

communicate with the gateway 10. The link between the cell phones 11 and the gateway can be wired or is typically wireless, such as by Bluetooth® to transceivers 605B. Internet protocol devices such as VoIP T,13 communicate with the gateway 10 through a link such as the USB transceiver 605U. A VoIP system typically comprises the personal computer 611 connected through the internet 620 to other telephonic devices T,T,T . . . . The gateway may also be directly connected to a VoIP device (ex: SIP phone) without a PC The gateway 10 can further comprise one or more of the FXS ports 601 for supporting multiple analog telephone networks 14n, and multiple FXO ports 603 for supporting multiple PSTN service lines 12.

Audio paths can be interconnected in any combination between cell phones 11, PSTN 12, VoIP 13 and analog telephone networks 14n. For example, one can conference a phone call between a remote telephonic device T such as an analog phone 14 and cell phone 11. Other data transfer is supported such as data between telephonic devices T. For example, a test message stored on cell phone 11 can be sent to telephone 14 or VoIP 13 through personal computer 611. Data can be received from one telephonic device T, modified on another device T and transferred to another or return to an originating device.

Mobile devices can include cell phones 11 or GSM transceivers, CDMA, and PDA (not detailed) using Bluetooth®, through USB interface 605U or other wireless/wired connection.

The personal computer 611 can communicate with the gateway 10 through a Bluetooth®, USB or other wireless/wired link. At the personal computer 611, software programs, stored thereon and operated from memory, facilitate data and voice link transfer and storage. Other software programs can configure operation of the gateway 10, including parameters to define operation of each of the gateway interfaces 601, 603, 605. The personal computer 611 can include data storage and memory for storage of data including phone book, text messages, and audio. The personal computer can configure and communicate with telephonic devices T to make/receive calls, or to further enhance the capabilities gateway through phone book backup/restore, and Tx/Rx text messages. Application software for the gateway 10 can be installed on the PC for facilitating dialing calls. For example, one could select any phone number on the personal computer's GUI such as by a conventional right-click of the input interface. The number could be from a word processing document, or text file, scratch pad, personal organizer or any other application. The application uses the gateway software to make a call or to send the number to a phonebook/directory of the connected telephonic device, such as cell phone 11. This provides a powerful implementation to download numbers into the phonebook in a quick efficient way. If there is no name attached, the software may optionally prompt for a name to be entered, before passing to gateway.

Further, the personal computer includes the ability to route audio, store, modify, and/or play back audio to/from any of telephonic devices T and personal computer-based audio devices including microphone and speakers. The gateway 10 includes the ability to send audio between telephonic devices.

The network 14n of analog telephones comprises Customer Premises Equipment (CPE) interfaced with the gateway 10. The analog telephones 14,14 are typically corded or cordless and may be programmable. The analog telephones 14 can receive data from the gateway via FSK, DTMF or other means for specific enhanced feature use. For example, the gateway 10 can facilitate reading phone book entries from cell phones 11,11,11 Tx/Rx, or text messages, or ability to transmit data via line manipulation or DTMF, or other means. The gateway 10 can write phone book entries to cell phones 11, or retrieve voice messages from the PSTN 14, cell phones 11 or a subscriber's internet services. Gateway programming includes compatibility with a variety of PBX systems, line equipment and digital terminals.

Examples of Gateway Functionality

Utilizing embodiments of the invention set forth above, the gateway can interconnect land lines, cell phones lines and other telecommunication lines. Embodiments of the invention enhance the functionality of otherwise conventional and limited signal line analog telephones. For example, single line analog phones can now access multiple service lines. Further, single line analog telephones can access enhanced features on telephonic devices such as cell phones. Such features include speed dialing, voice mail, and conference calling. Data between more capable telephonic devices can be moved between telephonic devices.

The gateway uniquely identifies each telephonic device and a service line associated therewith as appropriate. In further embodiments of the invention, aside from the land line, each connected cell phone, cellular-equipped personal digital assistant (PDA), and internet device typically also have a service line associated therewith. The controller 10 can assign each telephonic device T,T . . . with a unique identification (ID) and each service line can also be assigned a unique line ID. Each line ID can be assigned a user-friendly line ID name. Each telephonic device, such as each cell phone presents to the gateway 10 with a unique identification or appearance via Bluetooth® or wired connection. Cell phone service line appearances in multi-line, Key Service Unit (KSU-type) systems are typically given line number, such as 1, 2, 3 . . . . Cell phones typically have some sort of 'friendly' name, usually a default name that comes from the manufacturer, or a user-defined name. The gateway retrieves this friendly name from each cell phone and uses it as the line ID name. This provides the user with a much clearer indication of what physical telephonic device is associated with which service line. Similarly gateway can assign a PSTN line 12 with a friendly name.

Features of a particular line can be programmed with reference to the line name. Events on the line, such as ringing, line in use, caller ID, and the like, can be provided to the user with the friendly device name, once again providing more information of which device the event is occurring on. This friendly name is delivered to the user via FSK to analog sets, digital signalling to digital sets or over the Ethernet to Ethernet (VoIP sets), or via Ethernet or USB to PC's. The friendly name of a telephonic device can be sent to an analog phone connected to the gateway (via FSK or DTMF or other signalling) or to a computer or PC which is connected to the gateway via USB, Ethernet or Bluetooth® connection. The computer or analog phone can also delete paired devices based on this information.

When pairing cell phones, as required by the Bluetooth® protocol, the friendly device name can be used to indicate which service line is paired to which telephonic device. This information can be retrieved from various places. Analog phones can request this information using DTMF tones and the related line ID name will be returned using FSK following industry standard Type I or Type II or Type III Analog Display Services Interface (ADSI) or custom formats. Digital sets can request the friendly name using digital signalling. Attached computers can also get the friendly device names for displayed on a screen.

Cell phones and Bluetooth® radios have a Received Signal Strength Indication (RSSI). The value of the RSSI provides an indication of how well the cell phones or radio is receiving the radio signal used to communicate. There may be multiple RSSI values, one for the cellular radio, one for the Bluetooth® radio (one for each side of the Bluetooth® link). A user may be interested in what the values of the RSSI are as it can help determine the optimal place to position the cell phone. On analog phones, DTMF tones can be used to request the RSSI values, which will be returned via FSK following industry standard Type I or Type II or Type III (ADSI) or custom formats. The same information can be provided to digital sets or VoIP sets using the appropriate communication protocols. An attached PC can display this information in utility applications.

Just it is known to lock a cell phone to specific carriers, the gateway can also be locked. Cell phone model, manufacturer, carrier or other specific information can be read from the cell phone and used to decide whether or not to allow the gateway to operate fully or at all. It may also be used to block specific carriers or allow only a specific set of carriers.

Analog telephones typically have limited means to communicate with upstream devices. The forms of communicating are usually limited to DTMF tones, pulse dialing, and hook flashes of various durations. Said analog telephones are designed to be connected to one line. As discussed with reference to FIGS. 3A and 3B, the gateway allows these signal line analog telephones to control multiple lines by interpreting various combinations of DTMF tones and hook flashes are control sequences. These control sequences can be used to specify a particular line to use for an outgoing call. They can also be used to enter programming modes to program the gateway. They can also be used to request status information from the gateway, such as RSSI values, cell phone friendly device names, etc. . . . The gateway can use any combination of these DTMF tones, hook flashes as control sequences. For examples, if the hook flash followed by a DTMF digit 2 is detected by the gateway, it may interpret this as a command to switch to line 2. If a DTMF * * * 1 2 3 is detected, the gateway can interpret this as a command to send the name of the device currently paired to lines 1, 2 and 3 to the analog set as a FSK message. As demonstrated, single line analog telephones are permitted to access multiple lines.

The gateway can provide extra information to the attached analog telephones when lines are ringing. Typically caller ID includes a name and a phone number. Because the attached analog telephones are only single line devices, they are not capable of indicating which gateway line is ringing. The line could be any of the attached cell phones, session initiation protocol (SIP) or VoIP, or analog phone lines. Because each of these lines has a line number (e.g. 1, 2, 3 . . . ) and/or a friendly device name, the gateway can insert this information into the FSK that is sent to the analog phones so that the analog phone displays it. The line number or friendly device name can replace or be merged with either the caller name or caller number.

Another way the gateway can cause analog phones to indicate which line appearance is ringing is to generate different ring patterns for different line appearances. By default it maybe generate a RING-LONG PAUSE-REPEAT pattern for line 1, and a RING-SHORT PAUSE-RING-LONG PAUSE-REPEAT pattern for line 2, etc. . . . or completely different ring patterns of any sort can be used. They may be selectable by the user using either an attached PC to program the gateway or using DTMF-hookswitch programming sequences to select a certain ring pattern for a particular line.

The gateway enables legacy, single line analog telephones to access features available on cell phones. Cell phones have a number of special dialing features such as speed dials, dialing voicemail, redial and voice dialing. The gateway can provide access to these features by interpreting DTMF-HOOK FLASH sequences from analog phones as commands to access these features. For example, the DTMF sequence 1# might mean to dial the voice mail number of the currently selected line appearance (which might be a cell phone or other type of line). The DTMF sequence 3# might mean to dial speed dial 3 on the currently selected line appearance (which might be a cell phone of other type of line). The DTMF sequence ## might mean to activate the voice dialing of the currently selected line appearance. If the current line appearance is a cell phone, then the gateway will activate voice dialing on the cell phone and route the audio from the analog phone set to the cell phone.

Some cell phones may not normally have access to all the above mentioned features. As described previously, some types of lines (e.g. analog telephone lines) might not have these features at all. The gateway can simulate these features by allowing information to be programmed for different lines. For example, a voice mail number could be programmed for a cell phone line appearance. The number can be programmed from any attached device (analog phone, digital phone, Ethernet phone, PC). Analog phones can program the gateway by using combinations of DTMF tones and hook flashes. Therefore, for example, an analog phone can program a number to the gateway that will be used as the voicemail number whenever a telephonic device requests that the voicemail number for that particular line be dialed The gateway can dictate the extent of connectivity and certain operations based on the presence or absence of certain of telecommunication service lines. Users can typically access any of these service lines from any of the downstream telephonic devices, be they analog, digital or VoIP in nature. It can be advantageous for the gateway to detect if any one these possible service lines are not present and perhaps restrict the operation of the gateway based on this detection. For example, using an appropriate algorithm, the gateway may determine that there is no land line connected. Accordingly, the gateway is configured so as to limit its operation or cease to function all together.

The methodology for detecting whether or not there is an attached land line can be challenging. The following embodiments demonstrate methodologies for detecting the presence of a land line for use by a cellular telephonic device.

As discussed with respect to FIG. 6, the FXS port or ports of the gateway generate conventional battery voltages delivering dialtones and ring voltages for enabling plain old telephone sets (POTS). Historically, FXS ports have had the same physical connector as conventional land lines generally associated with PSTN. An active land line is already powered. There are also cases where inactive lines may still be powered, i.e.: have a battery voltage present. As they are indistinguishable, a user could inadvertently connect a powered and line to the powered FXS port of the gateway which, if unprotected, can damage either the gateway or the phone company hardware. Such a connection could also cause service on the land line and the FXS port to fail.

One methodology comprises temporarily removing the FXS voltage, typically about 48V, from the FXS interface. The gateway monitors for the "tip/ring" voltage to drop zero. If the voltage does not drop to substantially zero within a certain threshold duration, the gateway can assume that there is another source connected such as an active land line. Difficulties with this approach include that circuit characteristics can cause the response to be too slow to be practical. Realistically, a connected analog phone would be off-hook which places an impedance across tip/ring, causing an FXS-applied voltage to drop more quickly.

In another methodology, according to an embodiment of the invention, a possibly less intrusive way for the gateway 10 to detect an active land line is to slowly vary the on-hook voltage at the FXS interface by several volts around the nominal value. For example, if the nominal tip/ring voltage is 48 volts, the FXS voltage can be slowly ramped down to 40 volts. This will not affect any legacy analog telephones connected. Even if the network 14n of analog telephones are on-hook there should be no current flowing across tip/ring. However, if there is an outside power source, a current will flow out of or into the FXS port. The gateway detects the current and with cut power from the FXS port so as not to cause damage. The gateway varies the voltage because if the outside voltage source happens to be identical to the FXS voltage, then no current will flow. By varying the FXS voltage, a voltage differential develops and some current flow can be detected.

The gateway can enable recording of calls where otherwise no capability has previously existed on a local network of analog phones. As all audio signals flow through the gateway, the gateway can redirect the signal or copy the audio signal to another telephonic device having recording capability. The gateway can route a copy of the audio signal to an attached recording device, such as the personal computer. The receiving device can then record all calls. All events that occur on any telephonic devise can also be routed to the receiving device so it can maintain a log of everything occurring. This allows all calls over any of the cell phones to be monitored or recorded. Calls over the VoIP lines can also be monitored or recorded. All calls and events over all lines and telephonic can be monitored or recorded. This includes inbound and outbound call traffic as well as call duration, dialed number, Caller ID and times.

As a result of the ability to route all audio signals any which way in the gateway, a telephonic device, such as the personal computer, can answer any calls and thus become an auto attendant or answering machine.

The gateway can assign each telephonic device, including each analog phone of a network of analog telephones, a default service line for outgoing phone calls. For example, a first cell phone might be setup to use a second cell phone for outgoing calls; a second analog telephone might be setup to have outgoing calls routed over the internet as a VoIP call. However, neither of these methods of calling is particularly well suited to emergency 911 calls. The gateway can intercept any outgoing call to directed emergency services (e.g. 911 or other emergency number) and always route it via an attached land line connection as described above for FIG. 6.

Further, as discussed for FIG. 6, the gateway can contain physical hardware or connection that ensures that in the case of a power outage, the FXS ports are routed to a landline connected to the gateway. A failsafe switch along the FXS-FXO connection enables redirection of the gateway control to the FXS-FXO connection. The gateway senses a power outage and failsafe connects the FXS port to the FXO port. The tip/ring of each FXS port can be redirected from the usual enhance gateway control and instead is directly connected to the land line FXO port during a power outage, so that all analog telephones can continue to make emergency calls if necessary. This avoids a common pitfall associated with VoIP-only gateways.

The gateway can further make VoIP services and features available to all connected telephonic devices. A few of the numerous personal computer-based VoIP providers include Skype® and MSN Messenger®. The gateway can access these providers via the personal computer connection. The gateway can then make VoIP services accessible to all attached telephonic devices, be they digital, Ethernet or legacy analog based. This includes the ability to use enhanced features such as speed dials, dialing by voice, and dialing by username. The gateway can also pass the name of the calling party and/or service type via FSK to analog telephones or by other means to digital/Ethernet sets.

The attached personal computer can communicate with the gateway for instructing the gateway to perform actions including, but not limited to: dialing calls, answering calls, generating tones, and routing audio. The gateway can retrieve phonebook information from connected cell phones via the Bluetooth® connection or a cabled connection. The phonebook information can be passed to the attached personal computer. The personal computer can then store this information, or import the information into some other client application. Having the information stored in the personal computer allows the process to be reversed to copy/restore the phonebook data to another cell phone. Further, the gateway can direct the contents of cell phones or other mobile devices to the computer for storage, backup and other manipulation. This includes redial lists, call history, text message history and phone books or other configuration information stored on the mobile device. These may also be directed to cell phone devices, being the same or other devices, to 'copy' one set of data to another mobile device.

Analog telephones can browse phonebooks that may be stored on cell phones using DTMF and hook flash sequences as commands and can return responses via tones and FSK messages. For example, DTMF "8" might represent a "next" operation. Each time "8" is pressed a new FSK message burst is sent (formatted as either Type I or Type II or Type III or some other custom format) that causes the analog telephone to display the information on its display. Other features of the gateway can also be accessed this way.

The gateway has numerous advanced options that can be enabled or disabled. The gateway also has various settings can be specific to different regions/countries. Despite the enhanced functionality of analog telephones connected to the gateway, it can be tedious to various these options via the legacy interface. Optionally, special software can be executed on a connected personal computer which communicates with the gateway for providing an more convenient method to set the desired settings of the gateway. Software implemented on the personal computer can backup or upload current settings from the gateway and can restore or download new settings.

In another embodiment, the gateway may be used as an adjunct within digital key systems or Private Branch Exchanges (PBX's) having a local network of local telephone or desktop telephones. This allows the gateway to monitor the traffic between the key system and the terminals or desktop telephones attached thereto. In this way the gateway can also intercept messages. This gateway can use an physical or signal actuator such as a key, programmable button or signal sequence on the proprietary terminal as a cell phone line key. Correspondingly, the gateway can inject a signal to cause the desktop telephone to ring when the mobile device rings and inject signals for caller ID and all call control. This means the desktop telephone would have the ability to have a cell phone added to it, but still be integrated with all other existing features of the key system, including conference, hold, redial and call log. The gateway then acts as an inline filter which can interpret and even add events into the digital system's protocol stream to manipulate its behaviour. This will allow it to add virtual cell phone lines and have them appear on the desktop telephones.

Figure 7:
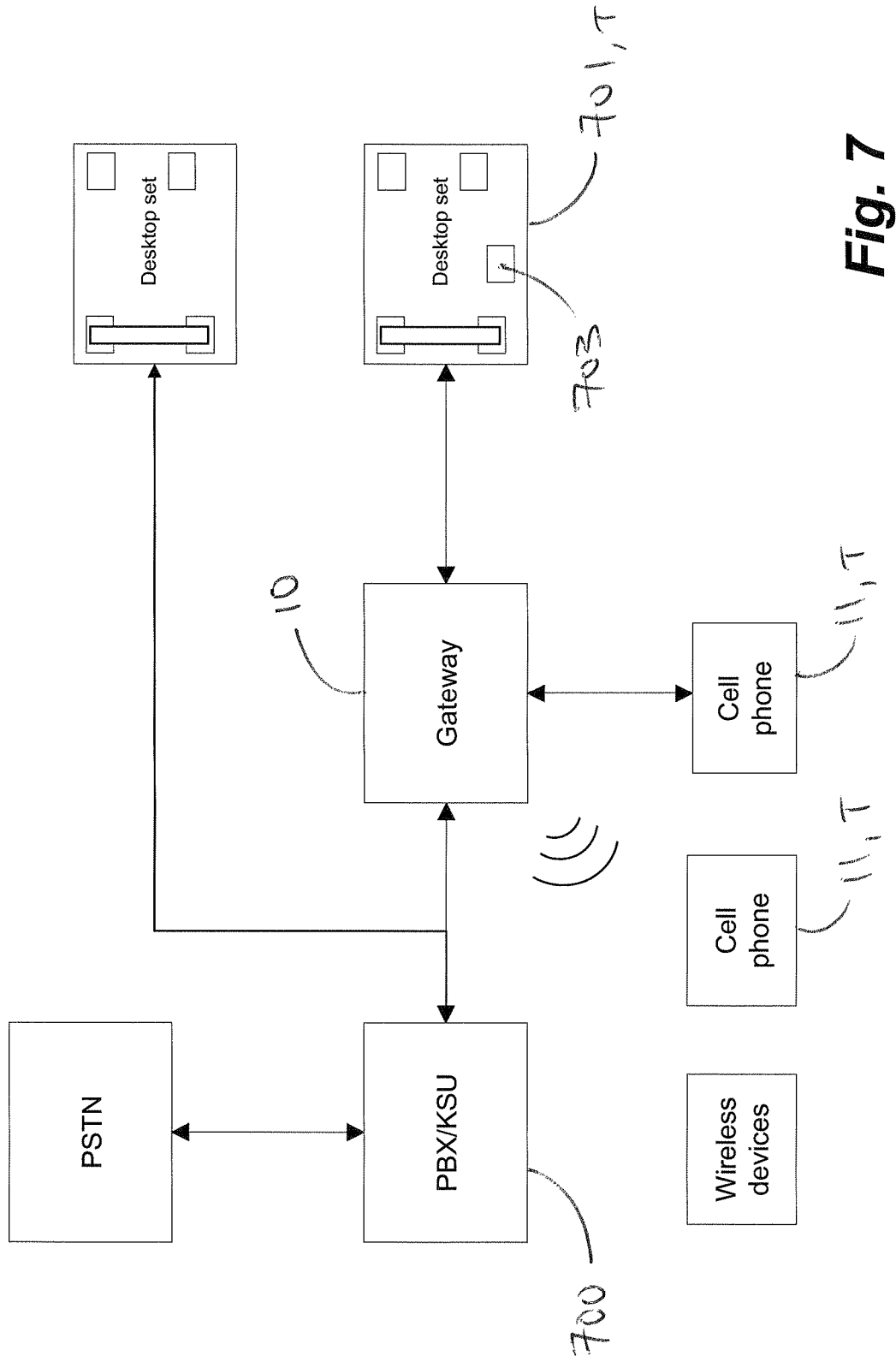
FIG. 7 is a schematic of a gateway interfaced with a PBX/KSU system.

Referring to FIG. 7 a digital key system comprises a PBX or a key system unit (KSU) and a network of one or more desktop telephones. The digital key systems, such as a PBX 700, implements a proprietary data stream between the PBX and each desktop telephone 701. In an embodiment of the invention, the gateway 10 can be situate between the PBX 700 and desktop telephone 701, each being a telephonic device T having a known protocol, and monitor the data stream therebetween. Further, the gateway 10 can insert events into the data stream. For example, a user of the system programs the telephone 701 with a special line identity or virtual line, e.g. '99', such as through a programmable button or key 703. When the programmable key is actuated, a state signal is generated and the gateway 10 intercepts that data request but does not pass it to through to the PBX 700. Recognizing the code identifies a cell phone 11, the gateway responds on behalf of PBX 700 and telephone 701 now behaves as through this programmable key 703 is programmed to instruct the PBX 700 to connect through that service line '99'. Accordingly, whenever this programmable key 703 is pressed at the telephone 701, the gateway 10 intercepts the data stream, routes call through to the service line associated with the cell phone 11 and manages the phone call therebetween.

Any features other features needed by a cell phone 11 can be intercepted and dealt with by the gateway 10 including redial access and dial, caller list access and dial. Similarly, if a phone call comes in on the cell phone 11, the gateway 10 can insert a message to cause the desktop telephones 701, programmed with the cell phone line appearance, to ring. This technique enables the gateway to show virtual lines on any telephone 701 connected to the PBX 700 without disrupting the PBX's normal mode of operation. The gateway enables grafting of a cell phone onto a system that wouldn't normally support cell phones.

The gateway can be configured to enable analog telephones to simulate a cell phone operation for dialing a number and keying the 'send' key. One example is to allow the user using the analog telephone to use the '#' key as the send key. Alternatively, the gateway can also run an algorithm which detects when dialing is finished and automatically sends the number without requiring the user to press the send key. Such an algorithm works as follows: there are two timeouts, a first timeout after entry of phone numbers of standard length; in North America this would be 7, 10, or 11 digits, and a second timeout for phone numbers of non-standard length. The timeout is longer for numbers having a non-standard number of digits. As DTMF digits are entered by the user, the algorithm calculates how many have been entered so far and then starts a timer. If the timer expires, reaching the first timeout, before another DTMF digit is entered, then the number is automatically dialed. The two timers ensure that if 7 or 10 or 11 digits have been entered, the number will be dialed more quickly, after the first timeout, then if a different amount of digits have been entered, after the second timeout. The algorithm also checks for emergency numbers. For example if 911 has been entered then it will be dialed immediately.

As discussed, the gateway can connect to multiple cell phones via Bluetooth®, the gateway handling pairing and master. There is a separate hardware button and lamp indicator for each cell phone connection. The lamp will indicate the current status of each cell phone connection via different cadences or colors. For example, if the line is currently connected the lamp may be solid on, if the line is currently not connected the lamp may be flashing. A separate button for each virtual line makes it simple to pair cell phones to a virtual line appearance and to connect/disconnect the Bluetooth® connection. The 1 button per line appearance is an important tool for simplifying the user interface. To pair a Bluetooth® cell phone to a particular line appearance, the appropriate button can be pressed to start the pairing process; one button for one touch per line.

As set forth above, the embodiments enable universal connectivity of telephonic devices including multiple cell phones, land lines, wireless devices. Analog phones can now access enhanced features of modern telephonic devices, Some examples of such enhanced operability have been included but in no way limits the implementation of any additional features, all of which implement communication through the gateway.

Optional Embodiments

Communications systems utilizing cell phones pose unique challenges. Typically a cell phone is a personal device and not a shared tool. When utilizing it as a shared device the following inventions overcome these problems.

Some users may wish to retain some aspects of privacy on their handsets, as they are typically more of a personal device than a landline, which is often a shared device. There are ways to preserve the privacy of these users, while still allowing them the convenience of using a gateway device to have extension sets and the associated benefits.

The gateway typically has inputs which may be landlines, VoIP lines and/or wireless lines. The back end consists of a device which converts these various independent signals into the typical analog 2 wire format used in home phone systems. The user then plugs in combinations of legacy telephone equipment such as corded and cordless phones from which to access the services from the divergent sources.

Ringing Alert/CLID Only at Extension Phones

The gateway broadcasts an incoming phone call visually and audibly over the telephonic devices.

The incoming phone call broadcast over the telephonic devices cannot be answered at all of the telephonic devices associated with the gateway and can only be answered by a target telephonic device to which the call is directed.

This concept allows users to be audibly alerted (ringing) and visually alerted (caller ID) to see who is calling at all extension sets, yet still only can be answered by a target telephonic device to which the call is directed. In this case only the wireless handset to which the call is directed can answer the call.

Calls show up, but cannot be answered at all extensions. For example, the user must answer using the target cell phone. The analog telephones are then just like ringing extensions. This will prevent others from picking up a call on certain lines, yet still notify a user of calls coming in on a mobile device.

This feature may or may not have the caller ID turned off.

The gateway can be programmed with these restrictions via DTMF from extension sets or with configuration software running on a computer which is attached to the gateway.

In this embodiment, the user can program the gateway via DTMF from an extension set or with configuration software run on a computer which is attached to the gateway.

Calls ring at all extensions and can be answered but the caller ID is not sent for that line.

Password Protection

Each of the telephonic devices associated with the gateway is provided with an address and the target telephonic device is identified when the address sent by the gateway corresponds to the address of the telephonic device and a source telephonic device from which the incoming phone call originates is connected to the target telephonic device.

Each of the telephonic devices associated with the gateway is pre-programmed such that depending on the type of the source telephonic device from which the incoming phone call originates, the call is answerable by a particular target telephonic device.

Each of telephonic devices associated with the gateway can also be provided with a password defined by a user.

The source telephonic device from which the incoming phone call originates is connected to the target telephonic device when the password entered by the user at the target telephonic device matches the password set by the user.

When the password entered by the user matches the set password, the source telephonic device is connected to the target telephonic device and details of the call are displayed on the target telephonic device used by the user.

Prior to entry of the password by the user, restricted details of the incoming call are displayed on the target telephonic device.

Details of the incoming call are displayed on the target telephonic device as a combination of images or alpha numeric characters.

Each line can have a different password defined by a user or administrator. The password can be set up using the configuration options on a computer attached to the gateway or using a series of DTMF codes. When a line is ringing, after the user picks up an extension set (target telephonic device), they must enter the passcode via DTMF and upon verification of the password, the call is connected. If the password does not match, the call is not connected. This prevents others from answering your cell phone.

A variation on this concept is to also block the caller ID until the password is entered, then CLID is sent to the off-hook extension via Type 2 caller ID protocol, so the user can still see who is calling before answering. This varies from standard caller ID delivery which is sent via Type 1 signalling while the extension is in 'on-hook' mode. In this embodiment, the Caller ID is withheld until the password is validated, but by then the user is off-hook, so the caller ID must be sent via Type 2 signalling ('off-hook' mode)

In this configuration, the gateway might send a different or restricted caller ID while the line is ringing. This caller ID will just indicate or also indicate what cell phone is ringing and who should answer the phone to enter their password.

Dial Through Feature

The gateway is programmed to auto-answer an incoming phone call or the gateway is programmed to auto-answer an incoming phone call after a preset number of rings.

The gateway is programmed to auto-answer an incoming phone call and subsequently dials out to the target telephonic device and connects the source telephonic device to the target telephonic device.

The gateway dials out to the target telephonic device after receiving a multi digit code entered via the DTMF keypad of the source telephonic device.

The gateway can be programmed to auto-answer an incoming call from either a specific number that has been pre-programmed into the memory off the gateway device or from any incoming number. It could also wait for a certain number of rings to occur before answering. Upon answering the first call, the gateway will then wait for a code (which may be entered via the DTMF keypad of the far end phone which started the call). This code directs the gateway to dial out on another line and then connect the audio paths. The gateway may be programmed to automatically answer the first call and dial out a second call without an authorization code.

For example, if you use a land line to call in to a cell phone that is attached to the gateway, the gateway can be directed to answer the call, request the user to enter a code which causes the gateway to dial out to a new number such as a landline, then connect them.

In another example, it may be cheaper to call a local cell phone and have the landline make the long distance call.

The internal gateway connection between lines can be between cell phone lines, VoIP lines, analog land lines, etc, or any combination of lines.

You can also use a cell phone to call a landline that is connected to the gateway, have the gateway answer, then enter a code to cause the gateway to dial out on one of the connected cell phones and connect the two cell phone paths.

It may be more economical and convenient to make a call in this fashion.

You can also direct the gateway to place an outgoing VoIP call. Then connect it.

Special Dial List

The gateway dials out to the target telephonic device after receiving a one digit code entered via the DTMF keypad of the source telephonic device.

The one digit code is associated with the number of the target telephonic device.

Data correlating the one digit codes to the numbers of the telephonic devices (forwarding numbers) associated with the gateway is stored in the gateway.

DTMF tones may not be a reliable method to communicate with the gateway to implement the Dial Through Feature. Using the network in this fashion may not be reliable with DTMF tones. The tones may get distorted when passing through the digital network in this fashion, and are often difficult to detect with standard DTMF detection practices. They may be attenuated in duration and amplitude. They may be compressed or distorted.

This can be overcome if you store a series of forwarding numbers in the gateway and then use the DTMF only to determine which dial through, one digit code to use. For example if you store 9 numbers in the gateway, you can press the corresponding '1' through '9' digit repeatedly until the DTMF detector can properly decode it. This has several advantages: only one digit need be decoded, thus reducing chances of error, the detector can ignore inter-digit pauses and simply keep looking until a valid tone is detected. The cumulative energy of the DTMF bands can be stored and an algorithm run to wait for the proper energy over a specified period in which to decode a digit.

Voice Recognition

The gateway includes a voice recognition engine which interprets voice instructions received from the user corresponding to one or more gateway functions using the source telephonic device.

The gateway may also incorporate a voice recognition engine which allows the originating user to speak the forwarding instructions and dial through number to the gateway.

Audible Active Line Indication

The gateway can be configured to provide a different dial tone for each available telephonic device.

There are potentially multiple cell phones and/or landlines and/or VOIP lines connected to the gateway device. When making outgoing calls it is advantageous to immediately know which line you are going to be dialing out on.

The gateway can be configured to provide a different sounding 'dial-tone' for each available line. In this way the user immediately can tell from the sound of the dial-tone which line is currently active.

The dial-tone may contain different frequencies or it may be pulsed or cadenced differently to indicate which is the active line.

Dynamic Prime Line

The gateway can be associated with a priority ranked list of prime lines, each prime line being connected to one of the telephonic devices.

The gateway connects the incoming phone call to the telephonic device associated with the highest ranked prime line.

It is common in multi-line systems to specify a certain line to be the preferred line to be used for outgoing calls. This is often called the prime line.

A phone system that consists of multiple mobile handsets is unique in that any of the handset line appearances might leave the system at any time because a user leaves with a handset. What is proposed is having a priority ranked list of prime lines. The highest ranked prime line that is present is used for outgoing calls.

Least Cost Routing

The gateway can be programmed to override the highest ranked set prime line and connect the incoming phone call to another telephonic device depending upon a set of rules based on availability and cost programmed into the gateway.

The gateway can override the assigned prime line to route certain numbers over the cheapest connection. It is sometimes cheapest to call a cell phone number from another cell phone and to call a land line number from another land line. The gateway has the opportunity to analyze the outgoing number dialed and determine which line is best to used for this outgoing call. There might be cellular lines available, land lines available, and/or VOIP lines available to route the outgoing call over. The decision of which line to use could be based on the area code or other number prefix. The decision could also be based on a list of number and corresponding lines to use. The decision could be based on any sort of rules programmed into the device.

White List/Black List

The gateway compares the number associated with the incoming phone call to a set of blocked numbers stored therein and does not allow the incoming phone call to proceed to the telephonic devices associated therewith when the number associated with the phone call matches a number stored therein.

The gateway compares the number associated with the incoming phone call to a set of allowed numbers stored therein and allows the phone call to proceed to the telephonic devices associated therewith when the number associated with the phone call matches a number stored therein.

The gateway can be setup so that all incoming calls pass through the gateway before ringing any telephone sets throughout the home/office. This gives the gateway the opportunity to filter (block by not ringing through to extensions sets) calls based on caller id/time date/other criteria. For example, the gateway could be setup with a black list of numbers that are blocked during regular hours. It can also contain a white list of numbers that are allowed to pass during late hours while all others numbers are blocked. The numbers on either list are fully configurable as are the times of when to implement one or the other. There could be other rules as well based on long distance or area codes, these numbers could always be blocked or always permitted or some combination depending on the time.

SMS Updates

The gateway relays Short Message Service (SMS), received from one SMS compatible telephonic device associated therewith, to other SMS compatible telephonic devices associated therewith.

The gateway can also generate a Short Message Service (SMS) for relay to SMS compatible telephonic devices associated therewith. The SMS generated and relayed by the gateway contains information about the state of a telephonic device associated therewith or a missed call or removal of a telephonic device or low battery on gateway.

The gateway has the ability to send Short Message Service [SMS] messages to cell phones or other devices via the connected cell phones or other methods such as over the Internet. These messages can be sent by the gateway when certain events occur that might be of interest to the remote party. For example a missed call on a certain line, the return of a certain cell phone back to proximity to the gateway, the removal of a cell phone line from the gateway, etc. . . . . . An event that the gateway can detect can be sent to a remote location for the purposes of notification.

Other Embodiments

Voice Mail Access

One of the telephonic devices associated with the gateway can be programmed with a voice mail access number and password of another telephonic device associated with the gateway for access of the voice mail stored on the another telephonic device. The voice mail stored on the another telephonic device can be deleted or saved.

The gateway can access voice mail stored on one telephonic device and can store the voice mail on another telephonic device for retrieval by the user.

Transfer of Features

A feature stored in one of the telephonic devices associated with the gateway can be uploaded to another telephonic device associated with the gateway via the gateway.

The feature is a directory list or a caller list or dialed call list or text messages received and sent or call timer information or visual prompts or call context dependent visual prompts.

Indicator Device

The phone system can further comprise at least one indicator device connected between the gateway and the local network of analog telephones; wherein the indicator device indicates characteristics about the incoming call, for example visually indicate the type of the source telephonic device from which the incoming phone call has originated.

The indicator device is a gateway jack comprising a plurality of visual indicating components located on the front face thereof.

The visual indicating components are Light Emitting Diodes (LEDs) or Liquid Crystal Displays (LCDs).

The indicator device can be mounted or installed on a wall in the vicinity of the analog telephones or the extension sets of the analog telephones.

One or more of the visual indicating components lights up when the indicator device receives a signal from the gateway thereby indicating the type of the source telephonic device.

Figure 8:
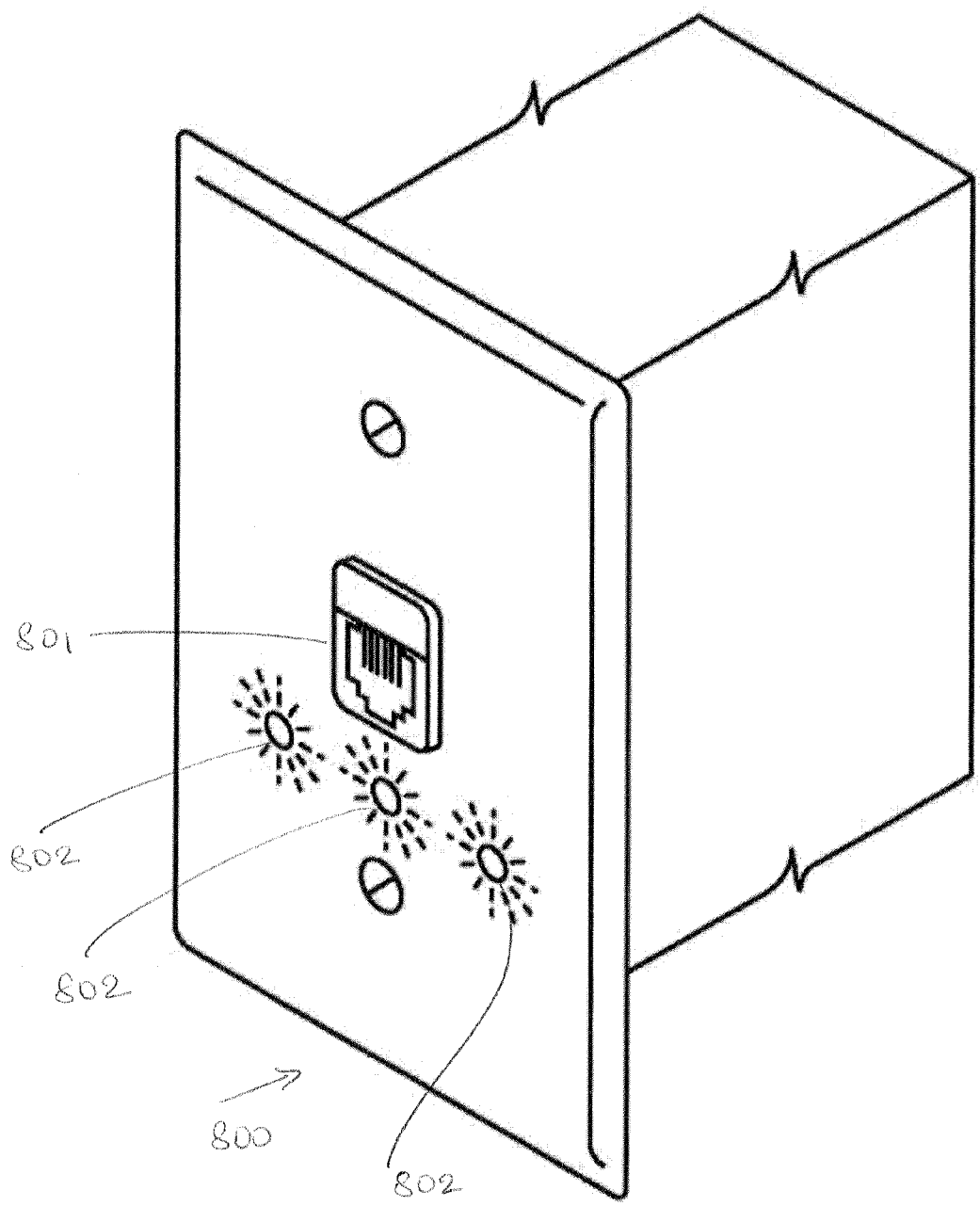
FIG. 8 is a schematic of an embodiment of the indicator device connected between the gateway and the local network of analog telephones.

With reference to FIG. 8, the indicator device 800 comprises a gateway jack 801 and the plurality of visual indicating components marked 802.

All of the features/options above under Optional Embodiments and Other Embodiments can be configured and controlled and modified via DTMF from extension sets or with configuration software running on a computer which is attached to the gateway. The gateway may be configured with all of the features detailed under Optional Embodiments and Other Embodiments or may be configured with a combination of some of the features detailed under Optional Embodiments and Other Embodiments.

The embodiments of the invention for which an exclusive property or privilege is claimed are defined as follows:

1. A phone system comprising a local network of analog telephones including a plurality of extension sets and a telephonic gateway for connecting the local network of analog telephones to two or more telephonic devices associated with the gateway, wherein the gateway comprises:
   a first port for mimicking a powered foreign exchange station (FXS) port and adapted for connecting to a network of one or more analog telephones;
   transceivers adapted for connection to two or more telephonic devices having at least two service lines associated therewith for carrying incoming and outgoing phone signals, the phone signals including phone calls;
   a power source for applying a nominal tip/ring voltage to the FXS port;
   a controller for managing events between the one or more telephonic devices, the analog telephones and the gateway comprising
      varying the applied voltage at the FXS port from nominal tip/ring voltages;
      monitoring current at the FXS port and if there is no monitored current then it is established that the FXS port is connected to the network of analog telephones;
      prior to connecting the telephonic devices to the gateway, managing security features associated with the gateway and the telephonic devices;
      interpreting the phone signals between the transceivers and each of the telephonic devices connected therewith for establishing a service line identity for each of the at least two service lines and a signal format for each of the telephonic device,
      receiving a state signal from one of the one or more analog telephones for selecting the service line identity bearing a phone call of interest,
      connecting the phone call for the selected line identity in a form compatible with the selected service line identify and the analog telephones; and after the connection to the gateway has been established, enabling data transfer features between the gateway and the telephonic devices.

2. The phone system as claimed in claim 1 wherein the gateway broadcasts an incoming phone call visually and audibly over the telephonic devices.

3. The phone system as claimed in claim 2 wherein the incoming phone call being broadcast over the telephonic devices cannot be answered at all of the telephonic devices associated with the gateway and can only be answered by a target telephonic device to which the call is directed.

4. The phone system as claimed in claim 3 wherein each of the telephonic devices associated with the gateway is provided with an address and the target telephonic device is identified when the address sent by the gateway corresponds to the address of the telephonic device and a source telephonic device from which the incoming phone call originates is connected to the target telephonic device.

5. The phone system as claimed in claim 3 wherein each of the telephonic devices associated with the gateway is pre-programmed such that, depending on the type of the source telephonic device from which the incoming phone call originates, the call is answerable by a particular target telephonic device.

6. The phone system as claimed in claim 3 wherein each of telephonic devices associated with the gateway is provided with a password defined by a user.

7. The phone system as claimed in claim 6 wherein the source telephonic device from which the incoming phone call originates is connected to the target telephonic device when the password entered by the user at the target telephonic device matches the password set by the user.

8. The phone system as claimed in claim 7 wherein when the password entered by the user matches the set password, the source telephonic device is connected to the target telephonic device and details of the call are displayed on the target telephonic device used by the user.

9. The phone system as claimed in claim 7 wherein prior to entry of the password by the user, restricted details of the incoming call are displayed on the target telephonic device.

10. The phone system as claimed in claim 8 wherein details of the incoming call are displayed on the target telephonic device as a combination of images or alpha numeric characters.

11. The phone system as claimed in claim 6 wherein the user can configure passwords for each telephonic device associated with the gateway using DTMF codes or using the controller of the gateway.

12. The phone system as claimed in claim 1 wherein the gateway is programmed to auto-answer an incoming phone call or the gateway is programmed to auto-answer an incoming phone call after a preset number of rings.

13. The phone system as claimed in claim 1 wherein the gateway is programmed to auto-answer an incoming phone call and subsequently dial out to the target telephonic device and connect the source telephonic device to the target telephonic device.

14. The phone system as claimed in claim 13 wherein the gateway dials out to the target telephonic device after receiving a multi digit code entered via the DTMF keypad of the source telephonic device.

15. The phone system as claimed in claim 13 wherein the gateway dials out to the target telephonic device after receiving a one digit code entered via the DTMF keypad of the source telephonic device.

16. The phone system as claimed in claim 15 wherein the one digit code is associated with the number of the target telephonic device.

17. The phone system as claimed in claim 16 wherein data correlating the one digit codes to the numbers of the telephonic devices associated with the gateway is stored in the gateway.

18. The phone system as claimed in claim 1 wherein the gateway is configured to provide a different dial tone for each available telephonic device.

19. The phone system as claimed in claim 1 wherein the gateway is associated with a priority ranked list of prime lines, each prime line being connected to one of the telephonic devices.

20. The phone system as claimed in claim 19 wherein the gateway connects the incoming phone call to the telephonic device associated with a highest ranked prime line.

21. The phone system as claimed in claim 19 wherein the gateway is programmed to override a highest ranked set prime line and connect the incoming phone call to another telephonic device depending upon a set of rules based on availability and cost programmed into the gateway.

22. The phone system as claimed in claim 1 wherein the gateway compares the number associated with the incoming phone call to a set of blocked numbers stored therein and does not allow the incoming phone call to proceed to the telephonic devices associated therewith when the number associated with the phone call matches a number stored therein.

23. The phone system as claimed in claim 1 wherein the gateway compares the number associated with the incoming phone call to a set of allowed numbers stored therein and allows the phone call to proceed to the telephonic devices associated therewith when the number associated with the phone call matches a number stored therein.

24. The phone system as claimed in claim 1 wherein the gateway relays Short Message Service (SMS) received from one SMS compatible telephonic device associated therewith to other SMS compatible telephonic devices associated therewith.

25. The phone system as claimed in claim 1 wherein the gateway generates a Short Message Service (SMS) for relay to SMS compatible telephonic devices associated therewith.

26. The phone system as claimed in claim 24 wherein the SMS contains information about the state of a telephonic device associated therewith or a missed call or removal of a telephonic device.

27. The phone system as claimed in claim 1 wherein the gateway includes a voice recognition engine which interprets voice instructions received from the user corresponding to one or more gateway functions using the source telephonic device.

28. The phone system as claimed in claim 1 wherein one of the telephonic devices associated with the gateway can be programmed with a voice mail access number and password of another telephonic device associated with the gateway for access of the voice mail stored on the another telephonic device.

29. The phone system as claimed in claim 1 wherein the gateway can access voice mail stored on one telephonic device and can store the voice mail on another telephonic device for retrieval by the user.

30. The phone system as claimed in claim 1 wherein a feature stored in one of the telephonic devices associated with the gateway can be uploaded to another telephonic device associated with the gateway via the gateway.

31. The phone system as claimed in claim 1 further comprising an indicator device connected between the gateway and the local network of analog telephones;
    wherein
        the indicator device indicates, visually, characteristics of the incoming phone call.

32. The phone system as claimed in claim 31 wherein the indicator device is a gateway jack comprising a plurality of visual indicating components located on the front face thereof.

\* \* \* \* \*